(12) United States Patent
Yamawaki et al.

(10) Patent No.: US 6,184,637 B1
(45) Date of Patent: Feb. 6, 2001

(54) ELECTRIC POWER STEERING APPARATUS (75) Inventors: Shigeru Yamawaki; Yasuo Shimizu, both of Wako (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/413,091

(22) Filed: Sep. 30, 1999

(30) Foreign Application Priority Data

Oct. 26, 1998 (JP) .................................................. 10-304371

(51) Int. Cl.[7] ........................................................ B62D 6/00
(52) U.S. Cl. .............................. 318/432; 318/632; 701/41
(58) Field of Search .................................... 318/432, 433, 318/561, 565, 566, 599, 626, 632; 180/443; 701/41

(56) References Cited

U.S. PATENT DOCUMENTS

| 4,730,686 | * | 3/1988 | Shimizu | 180/79.1 |
|---|---|---|---|---|
| 4,834,203 | * | 5/1989 | Takahashi et al. | 180/79.1 |
| 5,053,966 | * | 10/1991 | Takahashi et al. | 180/79.1 |
| 5,253,725 | * | 10/1993 | Nishimoto | 180/79.1 |
| 5,404,960 | * | 4/1995 | Wada et al. | 180/79.1 |
| 5,878,360 | * | 3/1999 | Nishino et al. | 701/41 |
| 5,881,836 | * | 3/1999 | Nishimoto et al. | 180/446 |
| 6,039,144 | * | 3/2000 | Chandy et al. | 180/446 |

FOREIGN PATENT DOCUMENTS

| 198 40 228 A1 | 3/1988 | (DE) . |
|---|---|---|
| 38 19 513 A1 | 6/1988 | (DE) . |
| 39 17 053 A1 | 5/1989 | (DE) . |
| 5-58318 | 3/1993 | (JP) . |
| 198 42 439 A1 | 3/1999 | (JP) . |

* cited by examiner

Primary Examiner—Bentsu Ro
(74) Attorney, Agent, or Firm—Merchant & Gould P.C.

(57) ABSTRACT

Electric power steering apparatus includes a control nit for controlling an electric motor to impart electric steering assist torque to the steering system of an automotive vehicle. The control unit is provided with a non-steady state detector section that generates a modification signal when it detects a non-steady state of the vehicle in which the steering wheel is turned to an excessive extent. Target motor current signal, which acts to impart the electric steering assist torque corresponding to manual steering torque, is modified by the control unit in accordance with the modification signal generated by the non-steady state detector section. Thus, the tire-to-steering-wheel torque is assisted in a returning direction of the steering wheel, so that the steering wheel is allowed to return to its center position at an increased speed.

7 Claims, 7 Drawing Sheets

ELECTRIC POWER STEERING APPARATUS

BACKGROUND OF THE INVENTION

1. Field of the Invention

The present invention relates generally to electric power steering apparatuses for use in automotive vehicles which provide an electric steering assist of an electric motor to the vehicle steering system to reduce a steering effort that is to be manually applied by a vehicle driver. More particularly, the present invention relates to an improved electric power steering apparatus which allows the steering wheel to return to its center position at an increased speed as the vehicle driver releases (takes his or her hands off) the steering wheel after excessive turning of the same.

2. Description of the Related Art

Generally, the electric power steering apparatuses for automotive vehicles are designed in such a way that when the vehicle driver releases the steering wheel after turning the steering wheel to change the direction of the vehicle, the tires are subjected to force (self-aligning torque) that acts to restore the tires to the straight-ahead position and thereby cause the steering wheel to be automatically returned to the center position.

However, it is known that as the steering wheel is turned more sharply during travel of the vehicle, the vehicle tends to turn less sharply than the vehicle driver intends (i.e., the vehicle exhibits a stronger understeering tendency) and it becomes more difficult for the steering wheel to automatically return to the center position when released. Such an understeering tendency occurs due to the fact that the self-aligning torque decreases as the slip angles of the tires on a road surface become greater. Particularly, the understeering tendency would appear notably when the road surface has a low friction coefficient ($\mu$) (and hence is slippery) or when the steering wheel is unintentionally turned to an excessive extent due to a light steering effort permitted by the electric power steering apparatus.

When the steering wheel is turned to an excessive extent on a slippery road surface, the automatic returning motion of the steering wheel after the driver releases the wheel is significantly retarded due to the reduced self-aligning torque, which would undesirably lead to a disturbance in the vehicle's traveling trail.

Figure 11:
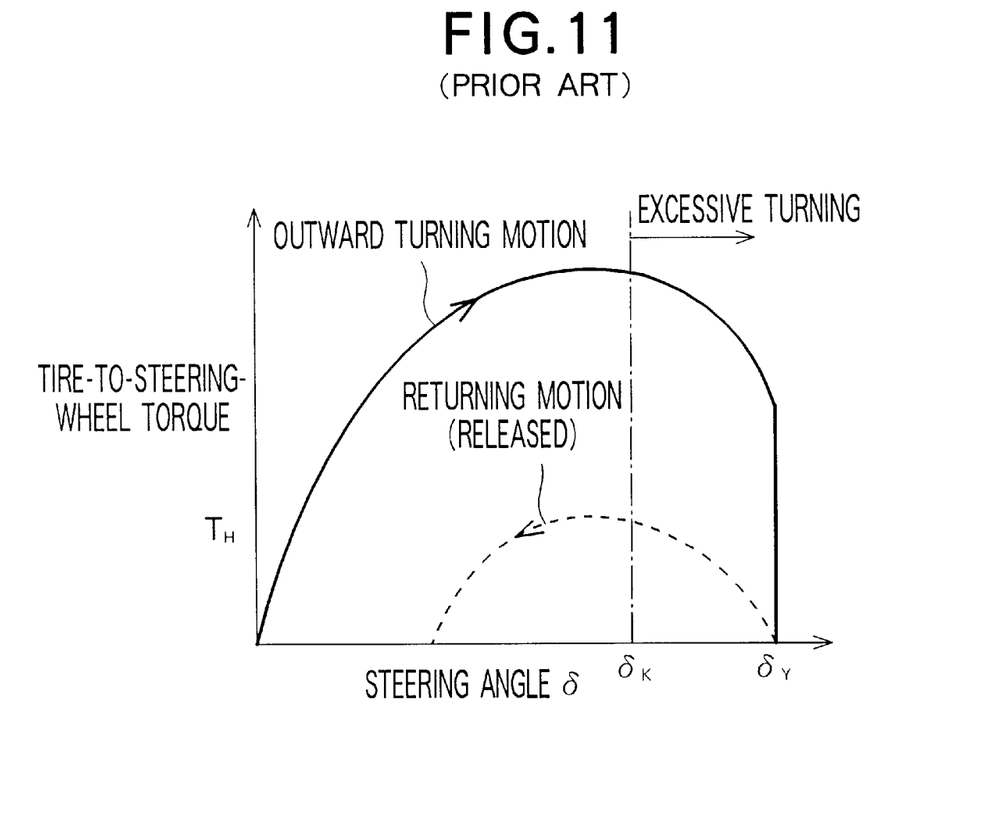
FIG. 11 is a graph showing a typical relationship between the steering angle and the tire-to-steering-wheel torque in a conventional electric power steering apparatus.

FIG. 11 hereof is a graph showing a typical relationship between a steering angle $\delta$ and torque $T_H$ applied from the tires to the steering wheel as the steering wheel is turned by the driver (this torque $T_H$ will hereinafter be called "tire-to-steering-wheel torque"). In FIG. 11, the tire-to-steering-wheel torque $T_H$ first becomes greater as the steering angle $\delta$ is increased by the vehicle driver turning the steering wheel outward (to the left or right) from the center position. After the steering angle $\delta$ exceeds a steady-state threshold value $\delta_K$ and enter a region representing an excessively-turned state of the steering wheel, however, the tire-to-steering-wheel torque $T_H$ decreases, as indicated by a solid-line curve. Subsequently, when the vehicle driver releases the steering wheel at a steering angle $\delta_Y$, the steering wheel returns to the center position gradually, rather than immediately, because the tires apply very small tire-to-steering-wheel torque $T_H$, as indicated by a broken-line curve. Then, once the steering angle $\delta$ gets smaller than the steady-state threshold value $\delta_K$, the steering wheel returns at a normal rate.

Region (or area) of the tire-to-steering-wheel torque $T_H$ defined by the turning-motion characteristic curve and returning-motion characteristic curve of the steering wheel represents the intensity of the steering-wheel returnability; that is, a smaller area of the tire-to-steering-wheel torque $T_H$ defined by the turning-motion characteristic curve and returning-motion characteristic curve of the steering wheel represents a greater steering-wheel returnability.

If the steering-wheel returnability becomes very small after the steering angle $\delta$ exceeds the steady-state threshold value $\delta_K$, a longer time would be required for the steering wheel to return to the center position. Thus, the conventional electric power steering apparatuses present the problem that the traveling trail of the vehicle would undesirably expand outward, resulting in a disturbance in the vehicle behavior.

SUMMARY OF THE INVENTION

It is accordingly an object of the present invention to provide an electric power steering apparatus for an automotive vehicle which, even when the steering wheel is turned to an excessive extent such that the steering angle exceeds a steady-state threshold value, allows the steering wheel to return to the center position at an increased speed and thereby achieves stabilized vehicle behavior.

In order to accomplish the above-mentioned object, the present invention provides an electric power steering apparatus for a vehicle which comprises a steering torque sensor for detecting steering torque applied to a steering system of the vehicle, an electric motor for imparting electric steering assist torque to the steering system, and a control unit for controlling operation of the electric motor. The control unit in the inventive electric power steering apparatus includes a target motor current setting section for generating a target motor current signal on the basis of at least the steering torque detected by the steering torque sensor, a non-steady state detector section for detecting a non-steady state of the vehicle where the steering wheel is turned to an excessive extent from its center position and generating a modification signal for modifying or adjusting the value or level of the target motor current signal in response to detection of the non-steady state of the vehicle, and a modification section for modifying the target motor current signal in a returning direction of the steering wheel in accordance with the modification signal.

According to the electric power steering apparatus thus arranged, the target motor current signal, which acts to provide electric steering assist torque corresponding to manual steering torque, is modified by the modification section of the control unit, in accordance with the modification signal that is generated by the non-steady state detector section detecting the non-steady state, i.e., excessive turning of the steering wheel. Through the modification of the target motor current signal, the electric steering torque assist is caused to act in the returning direction of the steering wheel, thereby allowing the steering wheel to return to its center position at an increased speed.

In the present invention, the non-steady state of the vehicle is detected by determining a difference in slip angle between front and rear wheels of the vehicle. The difference in slip angle can be determined by evaluating an equation of $$\beta fr = (Y^* L/V) - \delta,$$

where $\beta fr$ represents the difference in slip angle, V a vehicle velocity, $\delta$ a steering angle, Y a yaw rate and L a wheelbase, i.e., a distance between the centerlines of the front and rear wheels.

In a preferred implementation, the control unit may further include a steering-wheel motion detector section that detects an outward turning motion (away from the center position) and a returning motion (to the center position) of the steering wheel. In this case, the modification section modifies the target motor current signal in the returning direction of the steering wheel in accordance with the modification signal when the steering-wheel motion detector section detects the returning motion of the steering wheel.

The control unit may include an understeering detector section that detects an understeering state of the vehicle. In this case, the modification section of the control unit modifies the target motor current signal in the returning direction of the steering wheel in accordance with the modification signal, on the basis of an understeering state detection signal generated by the understeering detector section detecting the understeering state of the vehicle and a returning motion detection signal from the steering-wheel motion detector section.

In another preferred implementation, the control unit may include a friction modification coefficient generator section that generates a friction modification coefficient corresponding to a friction coefficient of a road surface. In this case, the modification section modifies the target motor current signal in the returning direction of the steering wheel in accordance with a composite modification signal generated by combining together the modification signal from the non-steady state detector section and the friction modification coefficient from the friction modification coefficient generator section. Namely, for a slippery road surface of a low friction coefficient, the friction modification coefficient generator section generates a low friction modification coefficient so that the composite modification signal, which is a combination of the modification signal from the non-steady state detector section and the friction modification coefficient, takes a greater value and thereby allows the steering wheel to return to the center position at an increased speed. In a preferred implementation, the friction modification coefficient is determined on the basis of a ratio of a yaw rate to a steering angle.

BRIEF DESCRIPTION OF THE DRAWINGS

Certain preferred embodiments of the present invention will be described in greater detail with reference to the accompanying sheets of drawings, in which.

DETAILED DESCRIPTION OF THE PREFERRED EMBODIMENTS

Figure 1:
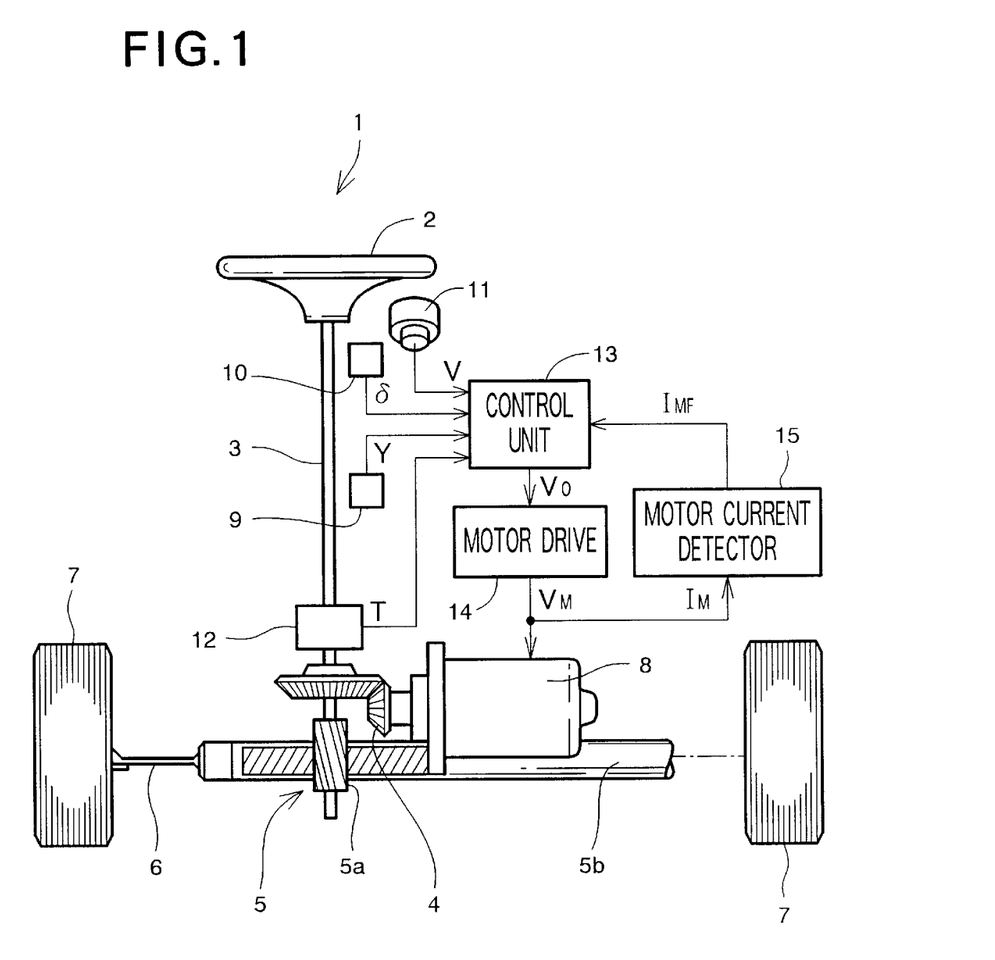
FIG. 1 is a block diagram showing a general organization of an electric power steering apparatus for an automotive vehicle according to a preferred embodiment of the present invention.

FIG. 1 is a block diagram showing a general organization of an electric power steering apparatus 1 for an automotive vehicle according to a preferred embodiment of the present invention. Mechanically, the electric power steering apparatus 1 comprises a steering wheel 2, a steering shaft 3, a hypoid gear 4, a rack-and-pinion steering gear mechanism 5 including a pinion 5a and a rack shaft 5b, left and right steered front wheels 7 connected to opposite ends of the rack shaft 5b via tie rods 6, and an electric motor 8 for generating and supplying an electric steering assist to the vehicle steering system.

As electric components, the electric power steering apparatus 1 comprises a yaw rate sensor 9, a steering angle sensor 10, a vehicle velocity sensor 11, a steering torque sensor 12, a control unit 13, a motor drive 14 and a motor current detector section 15.

The yaw rate sensor 9 detects a yaw rate of the vehicle and generates a yaw rate signal Y that is an electric signal representing the detected yaw rate. The steering angle sensor 10 detects a steering angle of the front wheels 7 and generates a steering angle signal δ that is an electric signal representing the detected steering angle; in an alternative, the steering angle δ may be arithmetically generated on the basis of an operating angle of the steering wheel 2 using a gear ratio in a steering gear box (not shown). The vehicle velocity sensor 11 detects a velocity of the automotive vehicle and generates a vehicle velocity signal V that is an electric signal representing the detected vehicle velocity. The steering torque sensor 12 detects steering torque applied to the steering wheel 2 and generates a steering torque signal T that is an electric signal representing the detected steering torque.

The yaw rate signal Y, steering angle signal δ and steering torque signal T, which have respective intensities and directions (i.e., polarities), are supplied to the control unit 13 for processing to be described later. In the following description, the direction or polarity of the yaw rate signal Y, steering angle signal δ and steering torque signal T is assumed to be positive (plus) when the detected yaw rate, steering angle and steering torque are in the clockwise direction and negative (minus) when the detected yaw rate, steering angle and steering torque are in the counterclockwise direction.

As the vehicle driver turns the steering wheel 2 to the left or right, i.e., outwardly away from the center position, the manual steering torque applied to the steering shaft 3 is converted, via the rack-and-pinion steering gear mechanism 5, into an axial linear movement of the rack shaft 5b, which changes the direction of the front wheels 7 by way of the tie rods 6. To assist the driver's manual steering effort, the electric motor 8 is driven in accordance with the steering torque signal T and vehicle velocity V, and output power or torque thus generated by the electric motor 8 is increased twofold via the hypoid gear 4 and applied to the steering shaft 3 as electric steering assist torque to reduce the driver's manual steering effort.

The control unit 13 of the steering apparatus, which comprises a microprocessor and a memory, generates a target motor current signal $I_{MS}$ (FIG. 2) on the basis of the steering torque signal T and vehicle velocity signal V, as well as a motor control signal $V_O$ corresponding to the target motor current signal $I_{MS}$. The motor drive 14 drives the electric assisting motor 8 with a motor voltage $V_M$, based on the motor control signal $V_O$, using the known PWM (Pulse Width Modulation) control technique. The motor current detector section 15 detects an actual motor current $I_M$ corresponding to forward or reverse rotation of the motor 8 and generates a motor current signal $I_{MF}$ representing the detected actual motor current $I_M$.

The control unit 13 generates the motor control signal $V_O$ corresponding to a difference in value between the target motor current signal $I_{MS}$ and the motor current signal $I_{MF}$ and controls the motor drive 14 in such a way that the difference between the target motor current signal $I_{MS}$ and the motor current signal $I_{MF}$ promptly becomes zero. The motor control signal $V_O$ is, for example, a composite of ON/OFF and PWM signals.

Figure 2:
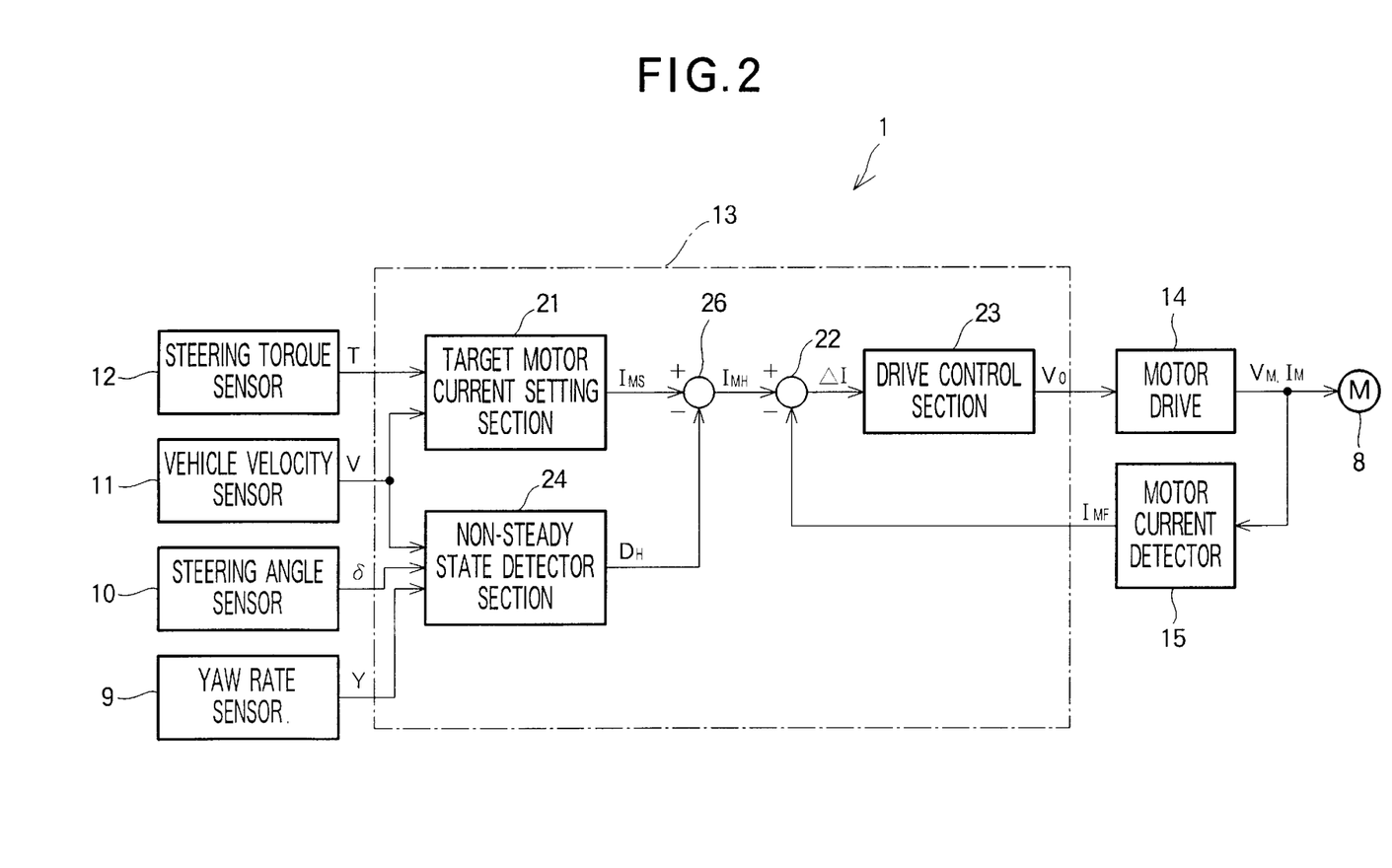
FIG. 2 is a functional block diagram of a control unit employed in the electric power steering apparatus of FIG. 1.

FIG. 2 is a functional block diagram of the electric power steering apparatus 1 of FIG. 1. In FIG. 2, the control unit 13 includes a non-steady state detector section 24 for detecting driver's excessive manual turning (hereinafter called "non-steady state") of the steering wheel 2 and generating a modification signal $D_H$ for modifying or adjusting the value or level of the target motor current signal $I_{MS}$ in response to detection of such a non-steady state, and a modification section 26. The control unit 13 determines a value of the modification signal $D_H$, i.e., a modification amount, on the basis of a difference in slip angle between the front wheels and the rear wheels (angle difference signal βfr). Specifically, the control unit 13 detects such a non-steady state or excessive manual turning of the steering wheel 2 on the basis of the steering angle signal δ from the steering angle sensor 10 and modifies the target motor current signal $I_{MS}$ in a returning direction of the steering wheel 2 in accordance with the modification signal $D_H$ supplied from the non-steady state detector section 24.

The motor drive 14 includes a bridge circuit composed of a plurality of (e.g., four) switching elements, such as power FETs (Field Effect Transistors) or IGBTs (Insulated-Gate Bipolar Transistors), and generates the PWM motor voltage $V_M$ on the basis of the motor control signal $V_O$ so that the motor 8 is driven to rotate in the forward or reverse direction in response to the motor voltage $V_M$.

The motor current detector section 15 converts the actual motor current $I_M$ into voltage by means of a resistor, Hall effect device or the like connected in series with the electric motor 8, and sends the motor current signal $I_{MF}$, representing the actual motor current $I_M$, to the control unit 13 for negative feedback to the target motor current signal $I_{MS}$.

Figure 7:
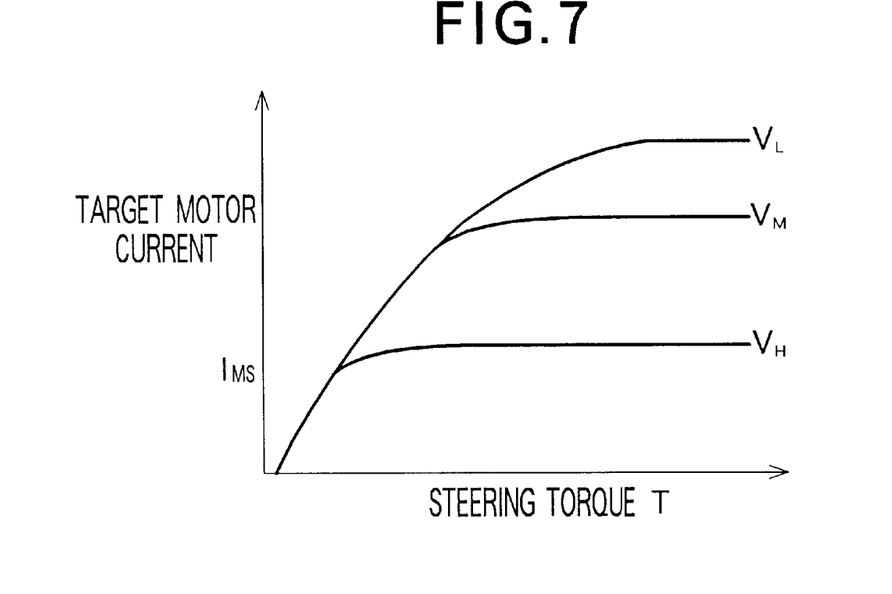
FIG. 7 is a graph showing a characteristic control curve of a target motor current signal versus steering torque with vehicle velocities as parameters.

The target motor current setting section 21 includes a memory, such as a ROM, which has prestored therein data indicative of a characteristic control curve of the target motor current signal $I_{MS}$ versus the steering torque with vehicle velocities V as parameters, as shown in FIG. 7, where "$V_L$" represents a low vehicle velocity level, "$V_M$" a medium vehicle velocity level and "$V_H$" a high vehicle velocity level. Upon receipt of the steering torque signal T from the steering torque sensor 12 and the vehicle velocity signal V from the vehicle velocity sensor 11, the target motor current setting section 21 reads out one of the prestored values of the target motor current signal $I_{MS}$ corresponding to the value of the received steering torque signal T and passes the read-out value to the modification section 26 as the target motor current signal $I_{MS}$.

As clear from FIG. 7, the target motor current signal $I_{MS}$ in the embodiment is set to decrease in value as the vehicle velocity V increases, so that great electric steering assist torque is given at low vehicle velocities while stable steerage is achieved at high vehicle velocities.

The control unit 13 also includes an offset calculator section 22, which computes a difference or offset ΔI between values of a modified target motor current signal $I_{MH}$ supplied from the modification section 26 and the motor current signal $I_{MF}$ from the motor current detector section 15 (i.e., ΔI=$I_{MH}$–$I_{MF}$) and then supplies the drive control section 23 with an electric signal indicative of the thus-computed offset ΔI (=$I_{MH}$–$I_{MF}$). The drive control section 23, which includes a PID controller and a motor control signal generator, performs PID (Proportional, Integral and Differential) control operations on the offset signal ΔI supplied from the offset calculator section 22, and generates the motor control signal $V_O$, corresponding to a driver's clockwise (rightward) or counterclockwise (leftward) turn of the steering wheel 2, on the basis of a composite of the individual signals having been subjected to the PID control operations. Then, the drive control section 23 feeds the thus-generated motor control signal $V_O$ to the motor drive 14.

On the basis of the vehicle velocity signal V from the vehicle velocity sensor 10, steering angle signal δ from the steering angle sensor 10 and yaw rate signal Y from the yaw rate sensor 9, the non-steady state detector section 24 calculates the difference βfr in slip angle between the front and rear wheels of the vehicle, generates, on the basis of the slip angle difference βfr, the modification signal $D_H$ indicative of an amount by which the target motor current signal $I_{MS}$ is to be modified or adjusted in value or level, and feeds the thus-generated modification signal $D_H$ to the modification section 26.

Figure 3:
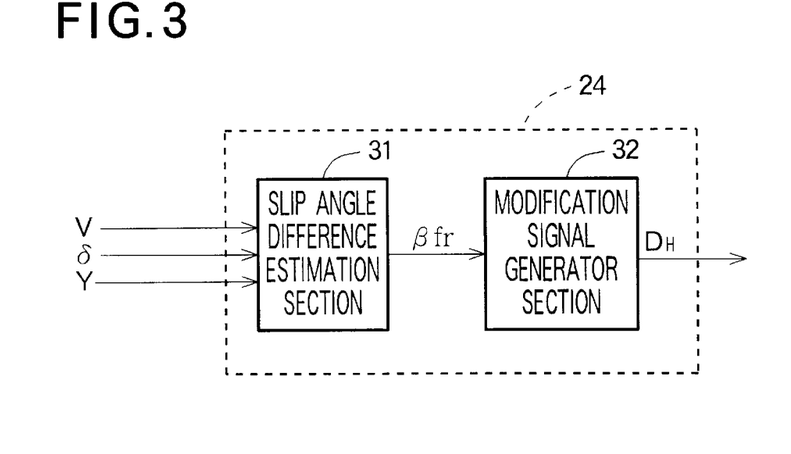
FIG. 3 is a block diagram showing details of a non-steady state detector section in the control unit of FIG. 2.

More specifically, the above-mentioned slip angle difference βfr is calculated by a slip angle difference estimation section 31 of the non-steady state detector section 24 as shown in FIG. 3. Namely, on the basis of the vehicle velocity signal V from the vehicle velocity sensor 10, steering angle signal δ from the steering angle sensor 10, yaw rate signal Y from the yaw rate sensor 9 and dimensional parameters of the vehicle (such as a wheelbase L) prestored in memory, the slip angle difference estimation section 31 calculates the slip angle difference βfr as follows:

$$\beta fr = (Y*L/V) - \delta \qquad \text{Equation (1)}$$

Note that the slip angle difference βfr represents an angular difference between the direction of the tires and the direction of the vehicle which occurs as the vehicle makes a turn. Thus, when the steering wheel 2 is turned by the vehicle driver in the clockwise direction, the vehicle is directed counterclockwise relative to the direction of the front wheels, in which case if the clockwise direction is designated as the positive (plus) direction, then the slip angle (βf) of the front wheels is represented in the negative (minus) direction. In such a case, the slip angle (βr) of the rear wheels is also in the negative (minus) direction, so that the direction (sign) of the slip angle difference signal βfr is expressed in a negative (minus) value until the absolute value |βr| of the rear wheel slip angle (βr) becomes equal to or greater than the absolute value |βf| of the front wheel slip angle (βf).

Figure 8:
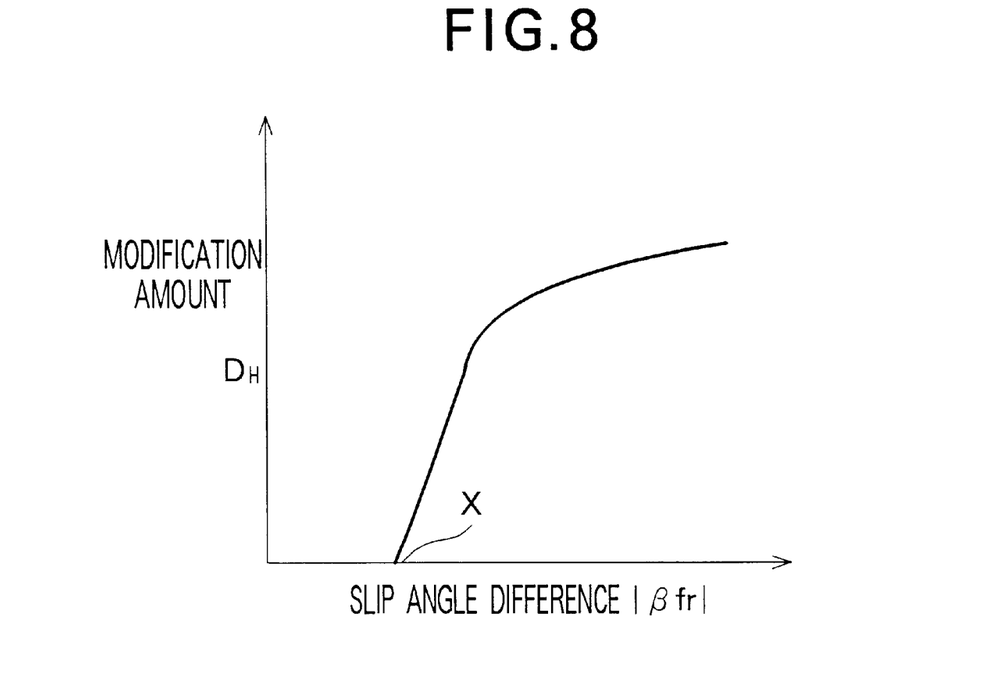
FIG. 8 is a graph showing a characteristic control curve of a modification amount versus a difference between slip angles of front and rear wheels of the vehicle.

The non-steady state detector section 24 of the control unit 13 further includes a modification signal generator section 32, details of which are illustrated in FIG. 3. The modification signal generator section 32, which comprises a memory such as a ROM, has prestored therein a characteristic control curve of the target motor current signal modification amount indicated by the modification signal $D_H$ versus the absolute value |βfr| of the slip angle difference βfr as shown in FIG. 8. Upon receipt of the slip angle difference signal βfr from the slip angle difference estimation section 31, the modification signal generator section 32 reads out, from the table, one of the modification amounts for the non-steady state which corresponds to the value of the received slip angle difference signal βfr and generates the modification signal $D_H$ indicative of the read-out modification amount. In the illustrated example of FIG. 8, a dead or zero-modification-amount zone is set for an initial region of the slip angle difference βfr, extending up to a threshold value "X", where the slip angle difference βfr falls within a steady-state range.

In FIG. 2, the modification section 26 calculates a difference $I_{MH}$ between the values of the target motor current signal $I_{MS}$ from the target motor current setting section 21 and the modification signal $D_H$ from the non-steady state detector section 24 ($I_{MH}=I_{MS}-D_H$) and supplies the offset calculator section 22 with the calculated difference $I_{MH}$ as a modified target motor current signal $I_{MH}$.

When the slip angle difference βfr is greater than the steady-state threshold value X (βfr>X) and indicating an excessively-turned state of the steering wheel 2 as shown by solid line in FIG. 8, the modification section 26 modifies the target motor current signal $I_{MS}$ in the returning direction of the steering wheel 2 in accordance with the modification signal $D_H$, so that the target motor current signal $I_{MS}$ is modified to decrease in value even during the outward turning motion of the steering wheel; thus an excessive turning motion of the steering wheel 2 can be effectively suppressed. Also, once the vehicle driver releases the steering wheel 2 during the outward turning motion, the target motor current signal $I_{MS}$ is set to becomes zero ($I_{MS}=0$) and the modification section 26 assists the steering wheel 2 in the returning direction in accordance with the modification signal $D_H$, thereby expediting the returning motion of the steering wheel 2 to the center position.

Because the control unit 13 of FIG. 2 includes the non-steady state detector section 24 for detecting the non-steady state or excessively-turned state of the steering wheel 2 to generate the modification signal $D_H$ and the modification section 26 for modifying the motion of the steering wheel 2 in the returning direction thereof in accordance with the modification signal $D_H$ as described above, the electric power steering apparatus 1 in accordance with the preferred embodiment of the present invention can assist the tire-to-steering-wheel torque in the returning direction of the steering wheel 2 in accordance with the modification signal $D_H$ and thereby allows the steering wheel to automatically return to the center position at an increased speed. As a consequence, the electric power steering apparatus 1 with the control unit 13 can effectively prevent a disturbance in the traveling trail of the vehicle, thereby achieving stabilized vehicle behavior.

Figure 4:
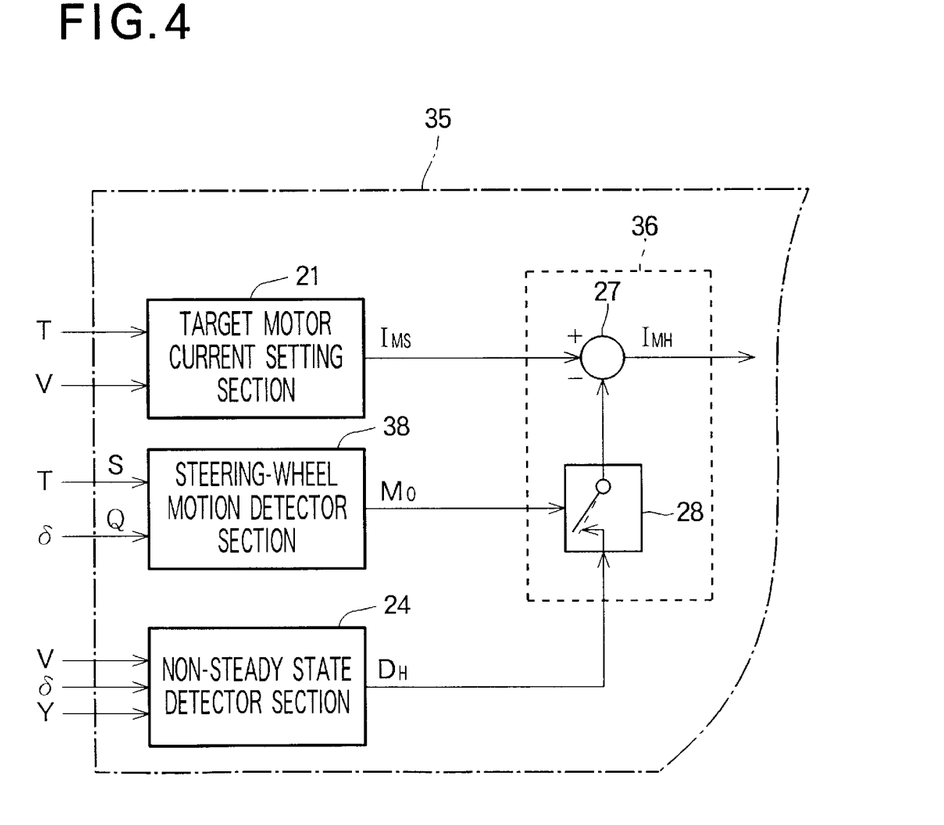
FIG. 4 is a block diagram showing a modification of the control unit in the inventive electric steering apparatus.

FIG. 4 is a block diagram showing a modification (i.e., second example) of the control unit in the inventive electric steering apparatus 1. This modified control unit 35 includes the offset calculator section 22 and the drive control section 23 as described above in relation to FIG. 2, which are, however, not shown in FIG. 4 and are not be described here to avoid unnecessary duplication.

The control unit 35 of FIG. 4 is characterized by inclusion of a steering-wheel motion detector section 38 which detects an outward turning motion or a returning motion of the steering wheel 2 on the basis of the direction S of the steering torque signal T supplied from the steering torque sensor 12 (FIG. 2) and the direction Q of the steering angle signal δ supplied from the steering angle sensor 10 (FIG. 2). When the steering-wheel motion detector section 38 detects the returning motion of the steering wheel 2 from the non-steady or excessively-turned state, the control unit 35 modifies the target motor current signal $I_{MS}$ in the returning direction of the steering wheel 2 in accordance with the modification signal $D_H$ from the non-steady state detector section 24.

Modification section 36 in this control unit 35 includes a subtracter 27 and a switching section 28. When a high (H)-level returning motion detection signal $M_O$ is received from the steering-wheel motion detector section 38, the switching section 28 is turned on (as indicated in broken line) to pass the modification signal $D_H$ from the non-steady state detector section 24 to the subtracter 27. When, on the other hand, a low (L)-level returning motion detection signal $M_O$ is received from the steering-wheel motion detector section 38, the switching section 28 is turned off (as indicated in solid line) to not pass the modification signal $D_H$ to the subtracter 27. The subtracter 27 computes a difference or offset between values of the target motor current signal $I_{MS}$ from the target motor current setting section 21 and the modification signal $D_H$ supplied via the switching section 28 from the non-steady state detector section 24, to thereby output a modified target motor current signal $I_{MH}$.

More specifically, when the directions S and Q of the steering torque signal T and steering angle signal δ are coincident with each other (S=Q), the steering-wheel motion detector section 38 of the control unit 35 determines that the steering wheel 2 is making an outward turning motion from the center position in response to a manual steering operation by the driver and supplies a low-level returning motion detection signal $M_O$ to the switching section 28. Conversely, when the directions S and Q of the steering torque signal T and steering angle signal δ are not coincident with each other (S≠Q), the steering-wheel motion detector section 38 determines that the steering wheel 2 is making a returning motion to the center position and supplies a high-level returning motion detection signal $M_O$ to the switching section 28.

Once the non-steady state detector section 24 detects the non-steady or excessively-turned state of the steering wheel 2 to output the modification signal $D_H$ and also the steering-wheel motion detector section 38 detects the returning motion of the steering wheel 2 to output the high-level returning motion detection signal $M_O$, the switching section 28 is turned on and passes the modification signal $D_H$ from the non-steady state detector section 24 to the subtracter 27, so that the subtracter 27 subtracts the modification amount, represented by the modification signal $D_H$, from the target motor current signal $I_{MS}$.

Because the control unit 35 of FIG. 4 is provided with the steering-wheel motion detector section 38 for detecting the outward turning motion or returning motion of the steering wheel 2 and the modification section 36 for modifying the target motor current signal $I_{MS}$ in the returning direction of the steering wheel 2 in accordance with the modification signal $D_H$ from the non-steady state detector section 24, the control unit 35, upon detection of the excessively-turned state of the steering wheel 2, can assist the tire-to-steering-wheel torque in the returning direction of the steering wheel 2 in accordance with the modification signal $D_H$ and thereby allows the steering wheel to return to the center position at an increased speed.

Figure 5:
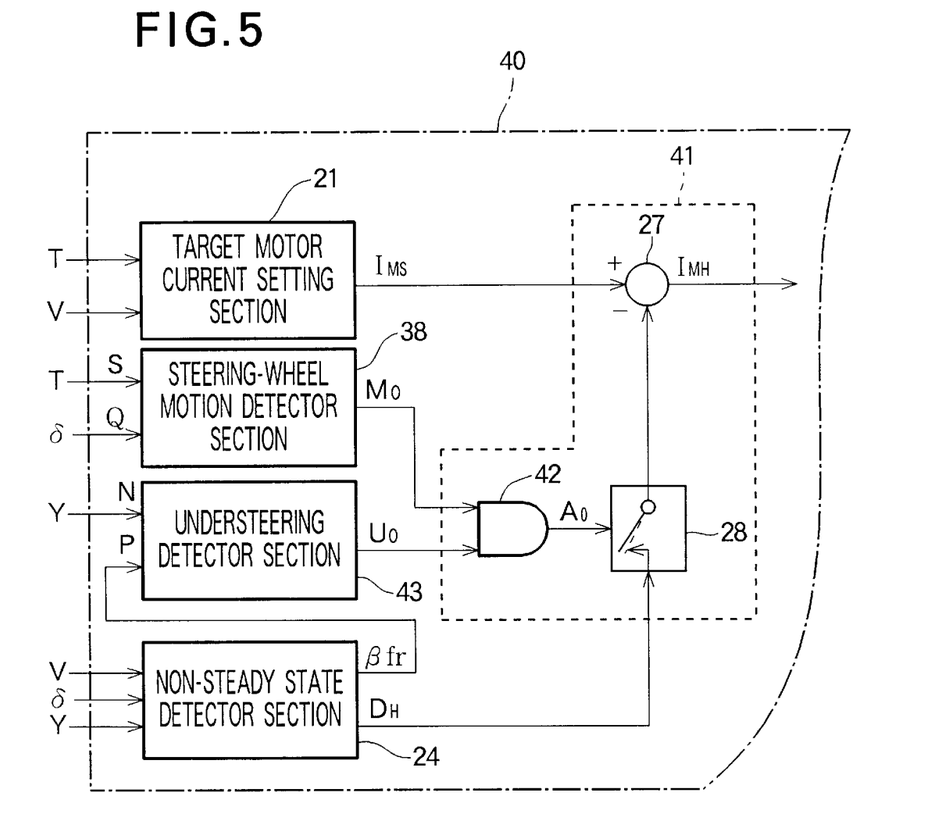
FIG. 5 is a block diagram showing another modification of the control unit in the inventive electric steering apparatus.

FIG. 5 is a block diagram showing another modification (third example) of the control unit in the inventive electric steering apparatus 1. This modified control unit 40 is characterized by inclusion of an understeering detector section 43 for detecting an understeering state of the automotive vehicle on the basis of the direction N of the yaw rate signal Y from the yaw rate sensor 9 (FIG. 2) and the direction P of the slip angle difference signal βfr. When the automotive vehicle is in the understeering state and the steering wheel 2 is making a returning motion from the excessively-turned or non-steady state, the control unit 40 modifies the target motor current signal $I_{MS}$ in the returning direction of the steering wheel 2 in accordance with the modification signal $D_H$ from the non-steady state detector section 24.

More specifically, when the understeering detector section 43 detects the understeering state of the automotive vehicle on the basis of the direction N of the yaw rate signal Y and the direction P of the slip angle difference signal βfr from the non-steady state detector section 24, it generate an understeering state detection signal $U_O$, which is sent to an AND operation section 42 of the modification section 41. When the directions P and N of the slip angle difference signal βfr and yaw rate signal Y are not coincident with each other (P≠N), the understeering detector section 43 detects that the vehicle is in the understeering state and generates a high-level understeering state detection signal $U_O$.

The modification section 41 includes a subtracter section 57 and a switching section 58, in addition to the AND operation section 42. Upon receipt of both the high-level returning motion detection signal $M_O$ generated by the steering-wheel motion detector section 38 detecting the returning motion of the steering wheel 2 and the high-level understeering state detection signal $U_O$ generated by the understeering detector section 43 detecting the understeering state of the vehicle, the AND operation section 42 outputs a high-level AND signal $A_O$ to the switching section 28. In response to the high-level AND signal $A_O$, the switching section 28 is turned on (as denoted in broken line) to pass the modification signal $D_H$ from the non-steady state detector section 24 to the subtracter 27. In turn, the subtracter 27 computes a difference or offset between values of the target motor current signal $I_{MS}$ from the target motor current setting section 21 and the modification signal $D_H$ supplied via the switching section 28 from the non-steady state detector section 24, to thereby output a modified target motor current signal $I_{MH}$.

Namely, the AND operation section 42 turns on the switching section 28 on the basis of the high-level returning motion detection signal $M_O$ generated by the steering-wheel motion detector section 38 detecting the returning motion of the steering wheel 2 and the high-level understeering state detection signal $U_O$ generated by the understeering detector section 43 detecting the understeering state of the vehicle, so that the switching section 28 passes the modification signal $D_H$ from the non-steady state detector section 24 to the subtracter 27 and the subtracter 27, in turn, subtracts the modification amount, represented by the modification signal $D_H$, from the target motor current signal $I_{MS}$.

Because the control unit 40 of FIG. 5 is provided with the understeering detector section 43 for detecting the understeering state of the automotive vehicle and the modification section 41 for modifying the target motor current $I_{MS}$ in the returning direction of the steering wheel 2 in accordance with the modification signal $D_H$ on the basis of the understeering state detection signal $U_O$ from the understeering detector section 43 and returning motion detection signal $M_O$ from the steering-wheel motion detector section 38, the control unit 40, upon detection of the returning motion of the steering wheel 2 and understeering state of the vehicle, can assist the tire-to-steering-wheel torque in the returning direction of the steering wheel 2 in accordance with the modification signal $D_H$ and thereby allows the steering wheel to return to the center position at an increased speed.

Figure 6:
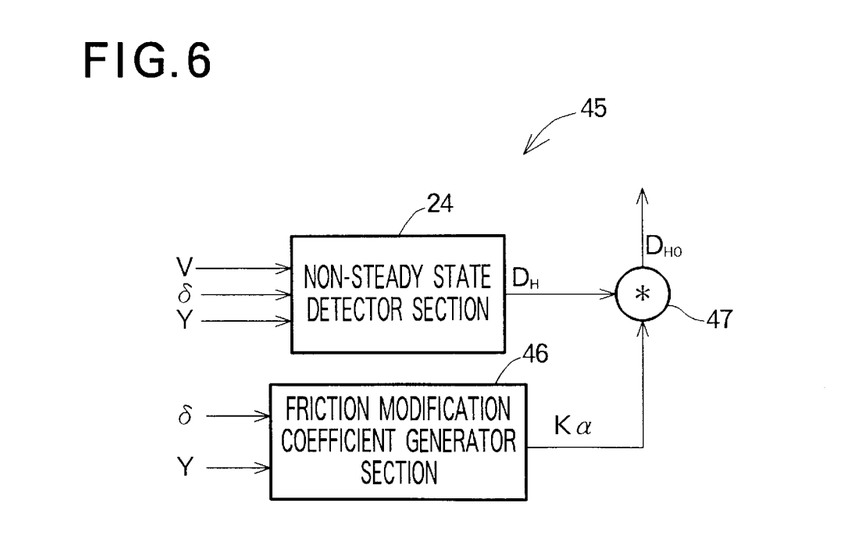
FIG. 6 is a block diagram showing still another modification of the control unit in the inventive electric steering apparatus.

FIG. 6 is a block diagram showing still another modification (fourth example) of the control unit in the inventive electric steering apparatus 1. This modified control unit 45 is characterized by inclusion of a friction modification coefficient generator section 46. The control unit 45 modifies the target motor current $I_{MS}$ in accordance with a composite modification signal $D_{HO}$ that is generated by combining together the above-mentioned modification signal $D_H$ from the non-steady state detector section 24 and a friction modification coefficient Kα generated by the generator section 46.

Figure 9:
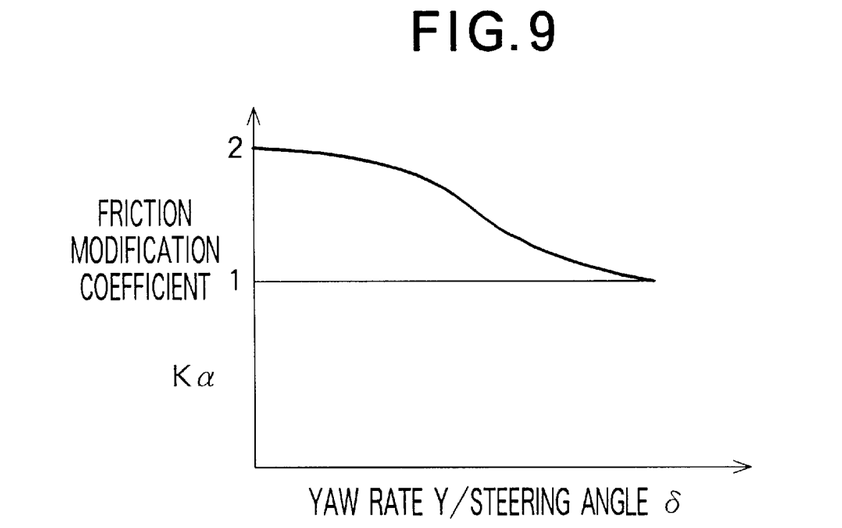
FIG. 9 is a graph showing a characteristic control curve of a friction modification coefficient versus a ratio of a yaw rate to a steering angle.

The friction modification coefficient generator section 46, which includes an arithmetic operator and a memory such as a ROM, calculates a ratio of the yaw rate Y to the steering angle δ (Y/δ), taking into account the fact that the yaw rate Y decreases relative to the steering angle δ as the friction coefficient μ of the road surface becomes smaller. In the memory, there is prestored a characteristic control curve of the friction modification coefficient Kα versus the ratio of the yaw rate Y to the steering angle δ (Y/δ), as illustrated in FIG. 9, which were determined empirically. Upon receipt of the yaw rate Y detected by the yaw rate sensor 9 (FIG. 2) and the steering angle δ detected by the steering angle sensor 10 (FIG. 2), the friction modification coefficient generator section 46 reads out one of the friction modification coefficients Kα which corresponds to the received yaw rate Y and steering angle δ and sends the read-out friction modification coefficients Kα to a multiplier 47. According to the characteristic control curve of the friction modification coefficient Kα versus the ratio of the yaw rate Y to the steering angle δ (Y/δ) of FIG. 9, as the friction coefficient μ of the road surface becomes smaller, the ratio Y/δ decreases so that the friction modification coefficient Kα takes a value greater than "1". On the other hand, as the friction coefficient μ of the road surface becomes greater, the ratio Y/δ increases so that the friction modification coefficient Kα takes a value of "1".

The above-mentioned multiplier 47 performs a multiplication between the modification signal $D_H$ from the non-steady state detector section 24 and the friction modification coefficient Kα from the friction modification coefficient generator section 46 (Kα*$D_H$), to generate a composite modification signal $D_{HO}$ to be supplied, in place of the modification signal $D_H$, to the associated modification section 26 (not shown in FIG. 6). By performing such a multiplication between the modification signal $D_H$ and the friction modification coefficient Kα, the composite modification signal $D_{HO}$ can take a great value for a road surface of a low friction coefficient μ, so that the tire-to-steering-wheel torque is assisted in the returning direction and thus the steering wheel can be returned to the center position at an increased speed.

Because the control unit 45 of FIG. 6 is provided with the friction modification coefficient generator section 46 for generating the friction modification coefficient Kα corresponding to the road surface friction coefficient μ and modifies the target motor current signal $I_{MS}$ in accordance with the composite modification signal $D_{HO}$ generated by combining together the modification signal $D_H$ from the non-steady state detector section 24 and the friction modification coefficient generated by the generator section 46, it can assist the tire-to-steering-wheel torque in the returning direction of the steering wheel by increasing the composite modification signal $D_{HO}$ for a slippery road surface of low friction coefficient $\mu$ and thereby allows the steering wheel to return to the center position at an increased speed.

Note that the "composite modification signal" $D_{HO}$ may be generated by adding a given amount corresponding to the friction coefficient $\mu$ to the modification signal $D_H$, rather than multiplying the modification signal $D_H$ by the friction modification coefficient $K\alpha$ as shown in FIG. 6. Further, the friction modification coefficient generator section 46 may be included in each of the other examples of the control unit 26, 36 and 41 shown in FIGS. 2, 4 and 5, respectively, so that the composite modification signal $D_{HO}$ is supplied to the associated modification section in place of the modification signal $D_H$.

Figure 10:
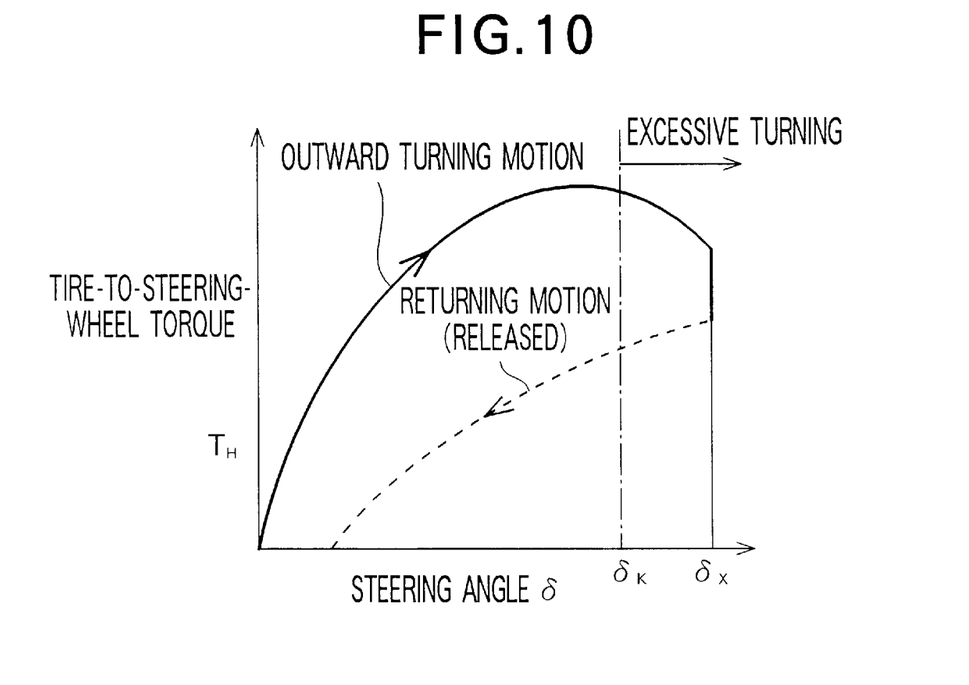
FIG. 10 is a graph showing a characteristic control curve of tire-to-steering-wheel torque versus a steering angle employed in the present invention.

FIG. 10 is a graph showing an exemplary characteristic control curve of the tire-to-steering-wheel torque $T_H$ versus the steering angle $\delta$ employed in the present invention. According to the characteristic control curve of FIG. 10, even after the steering angle $\delta$ exceeds the steady-state threshold value $\delta_K$ and enters a region representing the excessively-turned state of the steering wheel 2, the steering wheel motion is assisted in the returning direction in accordance with the modification signal $D_H$, so that the tire-to-steering-wheel torque $T_H$ is prevented from decreasing greatly even with the excessive steering angle $\delta_X$ beyond the steady-state threshold value $\delta_K$. Then, when the steering wheel is released at the excessive steering angle $\delta_X$, the steering wheel 2 can be returned quickly to the center position by the assistance of the modification signal $D_H$ in the returning direction. Such an assistance can effectively prevent a disturbance in the traveling trail of the vehicle, thereby achieving stabilized vehicle behavior.

What is claimed is:

1. An electric power steering apparatus for a vehicle comprising:

a steering torque sensor for detecting steering torque applied to a steering system of the vehicle;

an electric motor for imparting electric steering assist torque to the steering system; and     a control unit for controlling operation of said electric motor, said control unit including:

a target motor current setting section for generating a target motor current signal on the basis of at least the steering torque detected by said steering torque sensor;

a non-steady state detector section for detecting a non-steady state of the vehicle and generating a modification signal for modifying the target motor current signal in response to detection of the non-steady state of the vehicle; and         a modification section for modifying the target motor current signal in a returning direction of a steering wheel in accordance with the modification signal.

2. An electric power steering apparatus as recited in claim 1 wherein said non-steady state detector section detects the non-steady state of the vehicle by determining a difference in slip angle between front and rear wheels of the vehicle.

3. An electric power steering apparatus as recited in claim 2 wherein the difference in slip angle is determined by evaluating an equation of $\beta fr=(Y*L/V)-\delta$, where $\beta fr$ represents the difference in slip angle, V a vehicle velocity, $\delta$ a steering angle, Y a yaw rate and L a wheelbase.

4. An electric power steering apparatus as recited in claim 1 wherein said control unit further includes a steering-wheel motion detector section for detecting an outward turning motion and a returning motion of the steering wheel, and said modification section modifies the target motor current signal in the returning direction of the steering wheel in accordance with the modification signal on the basis of a returning motion detection signal generated by said steering-wheel motion detector section detecting the returning motion of the steering wheel.

5. An electric power steering apparatus as recited in claim 4 wherein said control unit further includes an understeering detector section for detecting an understeering state of the vehicle and wherein said modification section modifies the target motor current in accordance with the modification signal on the basis of an understeering state detection signal generated by said understeering detector section detecting the understeering state of the vehicle and the returning motion detection signal from said steering-wheel motion detector section.

6. An electric power steering apparatus as recited in claim 1 wherein said control unit further includes a friction modification coefficient generator section for generating a friction modification coefficient corresponding to a friction coefficient of a road surface and wherein said modification section modifies the target motor current signal in accordance with a composite modification signal generated by combining together the modification signal from said non-steady state detector section and the friction modification coefficient.

7. An electric power steering apparatus as recited in claim 6 wherein the friction modification coefficient is determined on the basis of a ratio of a yaw rate to a steering angle.

\* \* \* \* \*